United States Patent

[11] 3,552,569

| [72] | Inventors | James F. Zievers<br>LaGrange;<br>Russell W. Rietesel, Chicago; Henry Jr.<br>Schmidt, Hinsdale, Ill. |
|---|---|---|
| [21] | Appl. No. | 664,525 |
| [22] | Filed | Aug. 30, 1967 |
| [45] | Patented | Jan. 5, 1971 |
| [73] | Assignee | Industrial Filter & Pump Mfg. Co.<br>Cicero, Ill.<br>a corporation of Illinois |

[54] APPARATUS FOR PROCESSING MATERIALS
10 Claims, 15 Drawing Figs.

[52] U.S. Cl. .................................................. 210/189,
210/268, 210/279
[51] Int. Cl. ..................................................... B01d 33/30
[50] Field of Search.......................................... 210/279,
289, 422, 423, 268, 189, 33, 232; 137/590, 592;
23/270, 267

[56] References Cited
UNITED STATES PATENTS

| 2,134,114 | 10/1938 | Elliott............................. | 210/268X |
| 2,364,775 | 12/1944 | Brice............................. | 210/291X |
| 2,643,772 | 6/1953 | Martin........................... | 210/289X |
| 3,391,707 | 7/1968 | Riley et al...................... | 210/289X |
| 1,411,201 | 3/1922 | Barron .......................... | 210/289X |
| 1,780,821 | 11/1930 | Henderson..................... | 23/270X |
| 3,056,743 | 10/1962 | Eichhorn et al. .............. | 210/189X |

*Primary Examiner*—Samih N. Zaharna
*Attorney*—Fidler, Bradley, Patnaude and Lazo

ABSTRACT: Apparatus for regenerating materials by an ion exchange process or the like includes a vessel having a sloping bottom wall terminating in a material feed opening, a manifold connected to the central portion of the bottom wall of the vessel, and a series of radially extending perforated feed conduits communicating with the manifold and mounted in close proximity to the bottom wall within the vessel. The feed conduits extend radially from the manifold relative to the central axis of the vessel along its bottom wall so that regenerating fluid may be supplied to the vessel to regenerate the material contained therein.

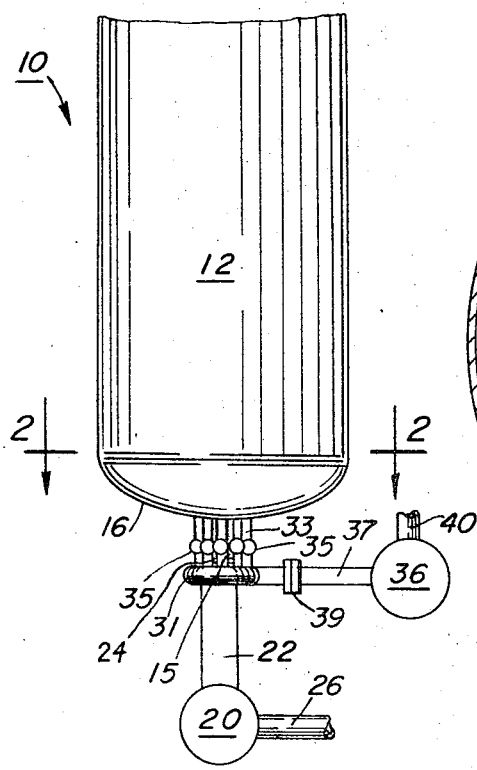
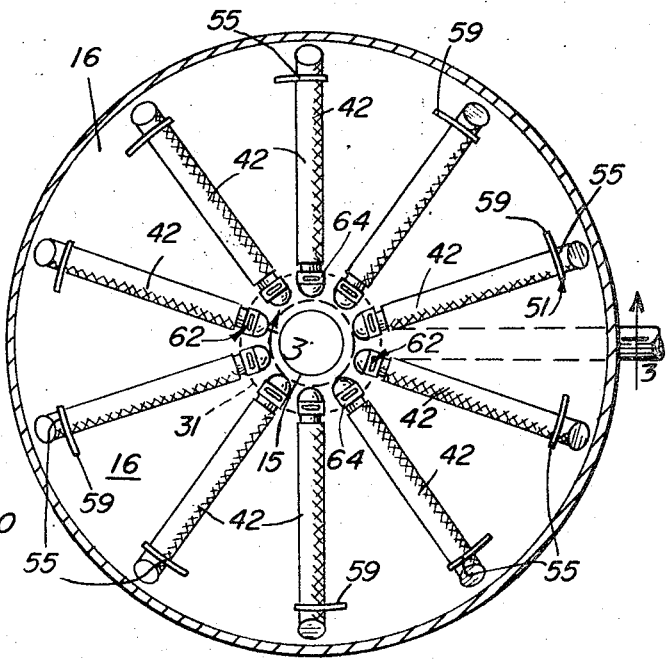
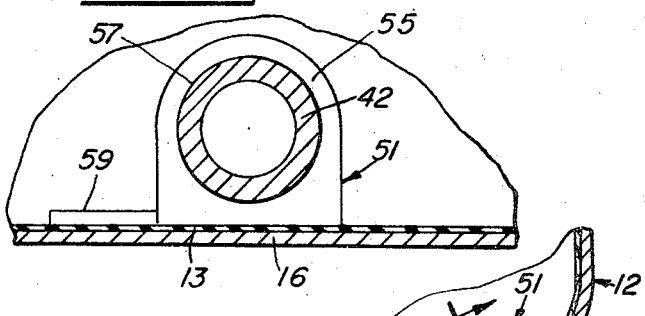
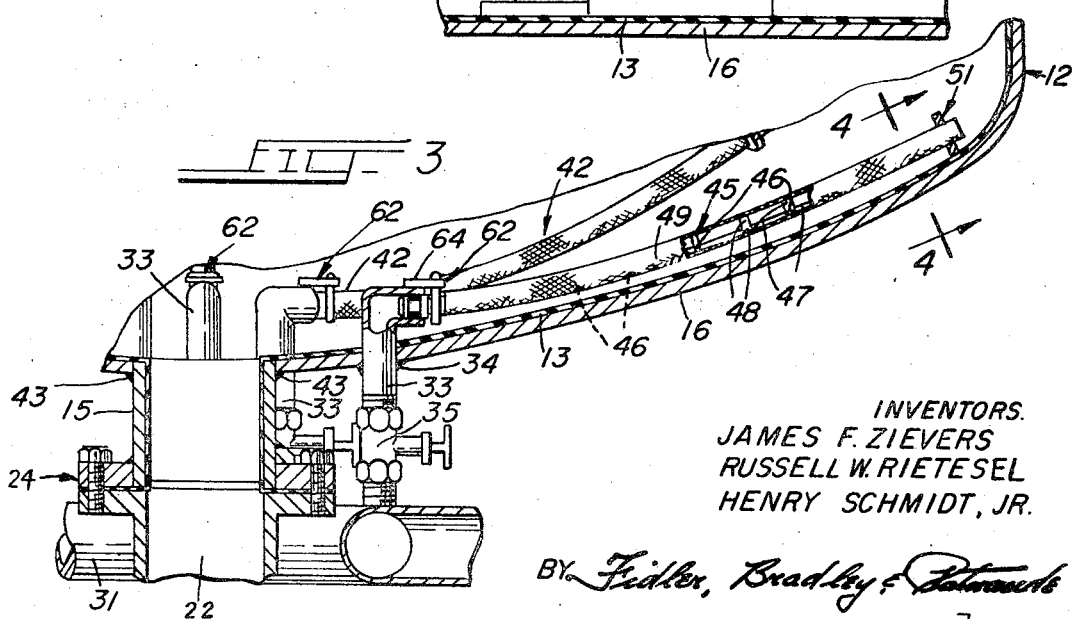
INVENTORS.
JAMES F. ZIEVERS
RUSSELL W. RIETESEL
HENRY SCHMIDT, JR.

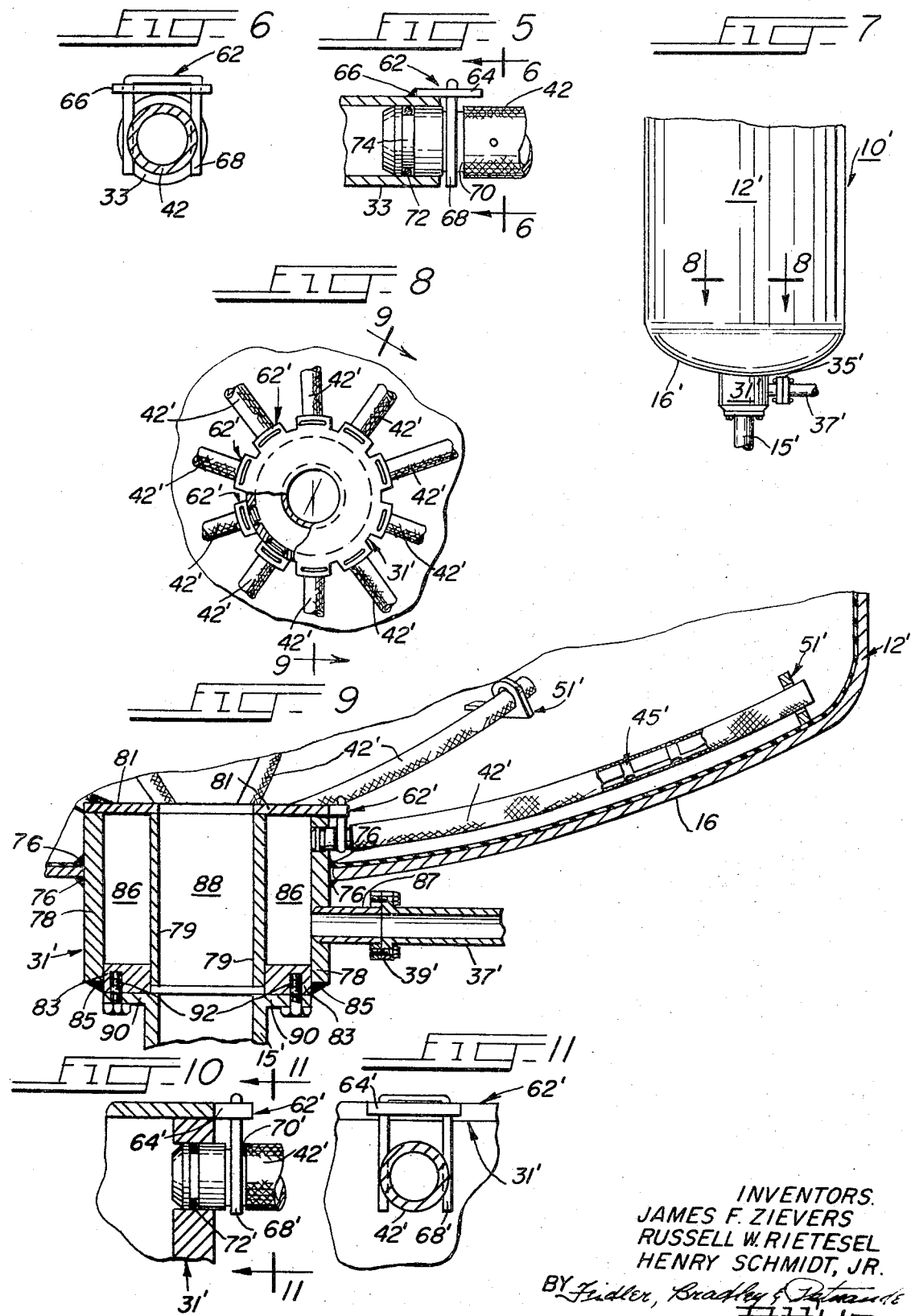

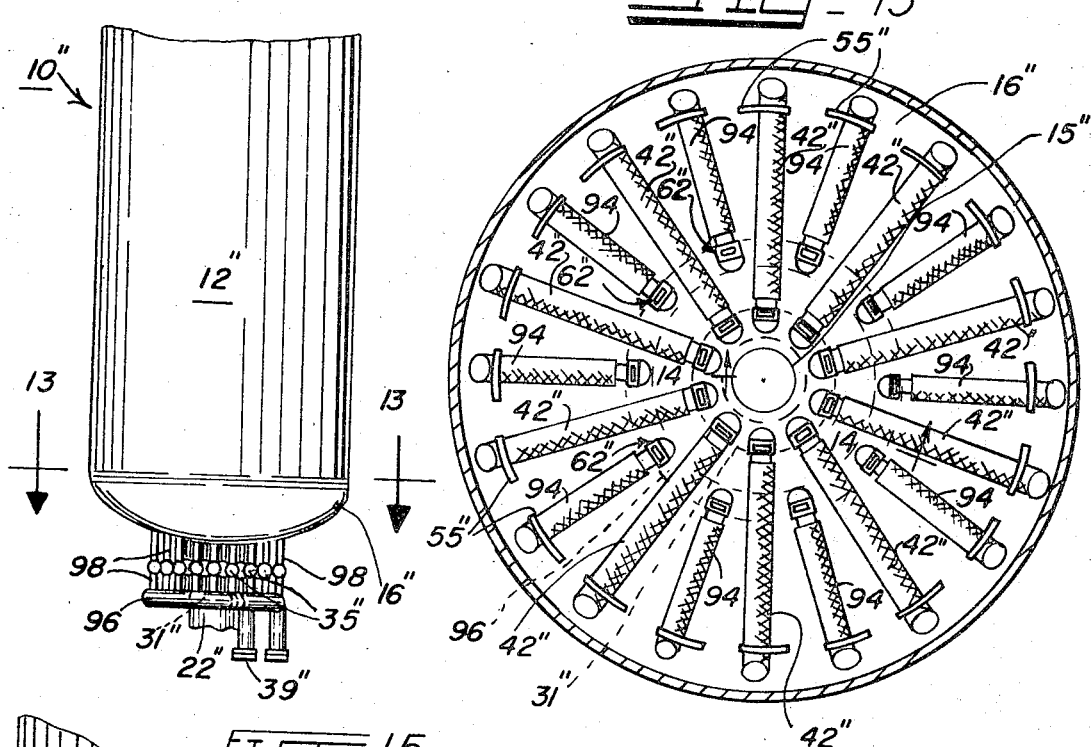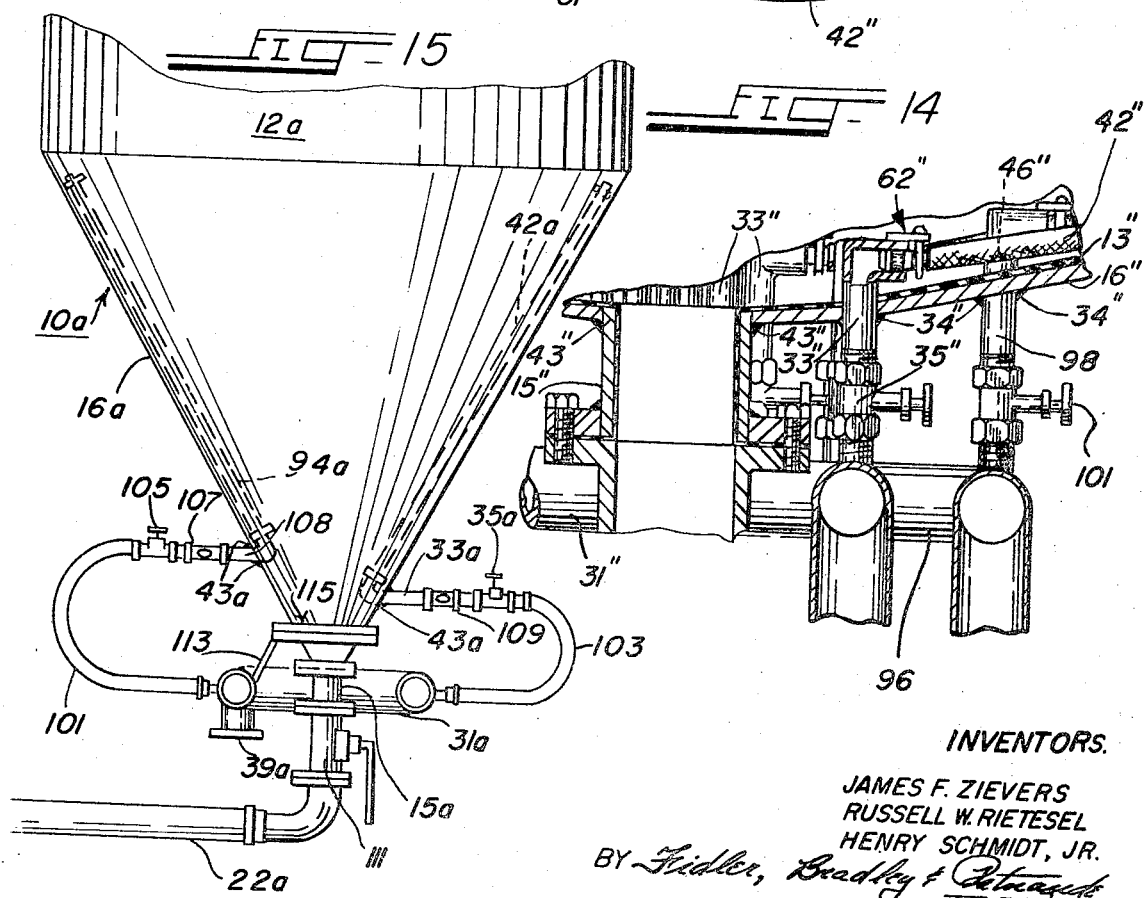

APPARATUS FOR PROCESSING MATERIALS

BACKGROUND OF THE INVENTION

The present invention relates to an apparatus for regenerating materials, and it more particularly relates to a system for regeneration of powdered or granulated resinous materials, and carbon, and the like materials, although many other materials including gaseous and liquid fluids and solids may be processed in the present apparatus.

In the past, various different types of apparatus have been employed for regenerating materials. According to one successful technique, resin material has been supplied or emptied into and out of a bottom opening in a material processing vessel in accordance with an ion exchange process. The process vessel included a sloped bottom wall terminating in a lowermost material feed opening, and regenerating fluid feeders for supplying fluid from a source of regenerating fluid under pressure to the resin material within the vessel. The fluid feeders comprise a manifold or header extending peripherally along the wall of the vessel at the interior thereof and a series of perforated feed conduits communicating with the manifold and extending radially from the manifold relative to the axis of the vessel. The construction of this apparatus is disclosed in detail in the U.S. Pat. application, Ser. No. 396,840, filed Sept. 16, 1964, entitled "Apparatus and Method for Regenerating Materials," which has now matured into U.S. Pat. No. 3,391,707. When employing this type of processing apparatus in some applications, it was discovered that the fluid feeder arrangement was not entirely satisfactory. Since the manifold extended along the inner wall of the vessel, the fluids were forced through a relatively great distance before entering the feed conduits, and hence an undue loss in pressure would result. Furthermore, as a result of mounting the manifold entirely within the vessel, the heavy resin material would tend to damage the manifold, and also the manifold occupied space within the vessel which could be utilized for other purposes. Therefore, it would be desirable to have a more efficient manifold which is smaller in size to eliminate the undue loss in pressure, and which occupies only a minimum amount of space within the vessel.

SUMMARY OF THE INVENTION

Therefore, it is the principal object of the present invention to provide a new and improved apparatus for treating materials.

Another object of the present invention is to provide a simple and efficient apparatus for supplying a regenerating fluid to a vessel containing material to be processed.

Briefly, the above and further objects are realized in accordance with the present invention by providing a generally arcuate manifold which is mounted on the bottom wall of the material processing vessel at the central portion thereof. A series of perforated feed conduits are connected in fluid communication to the manifold and extend from the manifold at the interior of the vessel in a radial direction with respect to the central axis of the vessel toward the sidewalls thereof. Since the manifold of the present invention is mounted at the central portion of the bottom wall, the manifold is substantially smaller in size than the prior art manifolds that extend along the inner sidewalls of the vessel. According to one construction of the manifold in accordance with the present invention, the manifold comprises a generally arcuate pipe located beneath the exterior of the bottom wall of the vessel for communicating with the radial feed conduits by means of a series of connecting pipes which extend through openings in the bottom wall of the vessel. In another embodiment of the invention, the manifold is in the form of a cylindrical hub which is mounted in a circular opening in the bottom wall of the vessel and which includes an annular manifold chamber for communicating with each of the feed conduits connected about the periphery of the manifold that extends into the vessel so that the center of the annular chamber forms a material feed passageway for the vessel and the regenerating fluid may be transferred through the annular chamber to the feed conduits.

In still another embodiment of the invention, a second set of radially-extending feed conduits are provided which are shorter in length than the first set of conduits with the longer conduits alternating with the shorter conduits. The additional set of conduits permits the system to have independent, and therefore flexible, control of the flow rates for different operations, such, for example, as processing and washing operations. The shorter conduits also provide a more uniform distribution of the liquid to the vessel. In order to accommodate the additional set of conduits, there is provided two separate manifold chambers, one for each of the two separate sets of feed conduits. According to another form of the invention which can accommodate the two separate sets of conduits, two sets of connecting pipes are provided to connect the both sets of feed conduits to a single manifold chamber.

BRIEF DESCRIPTION OF THE DRAWINGS

These and further objects of the present invention will be understood more fully and completely from the following detailed description when considered with reference to the accompanying drawings, wherein:

FIG. 1 is a schematic view of a system for processing material including a vessel and fluid transfer apparatus;

FIG. 2 is an enlarged, cross-sectional view of FIG. 2 taken substantially along the line 2-2 thereof;

FIG. 3 is an enlarged, cross-sectional view of FIG. 2 taken substantially along the line 3-3 thereof;

FIG. 4 is an enlarged, cross-sectional view of FIG. 3 taken substantially along the line 4-4 thereof;

FIG. 5 is an enlarged view of a connecting device for one of the feed conduits of FIG. 3;

FIG. 6 is a cross-sectional view of FIG. 5 taken substantially along the line 6-6 thereof;

FIG. 7 is a schematic view of a portion of another system for processing material in accordance with the present invention;

FIG. 8 is an enlarged, cross-sectional view of FIG. 7 taken substantially along the line 8-8 thereof;

FIG. 9 is an enlarged, front elevational view taken substantially along the line 9-9 of FIG. 8, assuming that FIG. 8 shows the lower portion of FIG. 7;

FIG. 10 is an enlarged, cross-sectional view of a connector for one of the feed conduits of FIG. 8;

FIG. 11 is a cross-sectional view of FIG. 10 taken substantially along the line 11-11 thereof;

FIG. 12 is a schematic view of a portion of still another system for processing material in accordance with the present invention;

FIG. 13 is an enlarged, cross-sectional view of FIG. 12 taken substantially along the line 13-13 thereof;

FIG. 14 is an enlarged, cross-sectional view of FIG. 13 taken substantially along the line 14-14 thereof; and FIG. 15 is a front elevational view of a portion of a further system for processing material in accordance with the present invention.

DESCRIPTION OF THE PREFERRED EMBODIMENTS

Referring now to FIG. 1, there is shown a material processing system 10 which may be used for regenerating resin material by an ion exchange process. The system 10 may incorporate the principles of the present invention and includes a material processing vessel or tank 12 having a rubber lining 13 (FIG. 3). While the top (not shown) may be opened to the atmosphere for some applications, ordinarily it is sealed by a suitable cover so that operation above or below atmospheric pressure is possible. For the purpose of transferring the resin material into and out of the vessel 12, a feed pipe 15 is connected to the central portion of a dish-shaped bottom wall 16 of the vessel 12 in fluid communication with the interior thereof and is aligned with the vertical axis of the vessel 12. A suitable material transfer apparatus 20 communicates with the pipe 15 by a pipe 22 which is connected to the pipe 15 at 24. The apparatus 20 can, for example, withdraw the resins from the vessel 12 and transfer them through a pipe 26 to a suitable storage or further stages of the process. The apparatus 20 can also be used to convey fluid entrained granulated resin to be regenerated through the pipes 22 and 15 into the vessel 12.

As shown in FIGS. 1 and 2, for the purpose of supplying regenerating fluids to the resins, an annular manifold or header 31 located beneath the exterior of the bottom wall 16 of the vessel 12 aligned with the central axis thereof communicates with the interior of the vessel 12 by means of a series of spaced-apart connector conduits or pipes 33 which extend through openings in the bottom wall 16 and which are welded in sealable engagement to the bottom wall 16 at 34 (FIG. 3). As a result, the regenerating fluids are distributed to the resins contained within the vessel 12 and then are removed from the vessel 12 via a suitably valved overflow port (not shown) located near the top of the vessel. The connector pipes 33 are connected to control valves 35 for individually controlling the flow of fluid through each connector pipe 33. A fluid transfer apparatus 36 is connected in fluid communication to the annular manifold 31 by means of a pipe 37 which is connected to the manifold 31 at 39. The apparatus 36 includes conventional devices, such, for example, as suitable valves, power equipment, and automatic control mechanisms, for supplying fluid or liquid entrained solids from a source of such fluid under pressure via a pipe 40 to the resin material within vessel 12.

Referring now to FIGS. 2—4, in order to evenly distribute the regenerating fluids to the resins within the vessel 12, a plurality of equally-spaced feed conduits 42 are connected to the ends of the connector pipes 33. As best illustrated in FIG. 3, each of the conduits 42 extends radially with respect to the axis of the material feed pipe 15 which is welded as shown at 43 to the central portion at the exterior of the bottom wall 16 of the vessel 12. For the purpose of distributing the regenerating fluids to the resins in the vessel 12, each of the conduits 42 generally conforms to the adjacent portion of the sloped bottom wall 16, and, as shown in FIG. 3 at 45, is provided with a plurality of perforations or apertures 46 which are connected in fluid communication with one another by a plurality of longitudinally extending grooves 47 and a plurality of peripherally extending grooves 48. The apertures 46 may be located in different positions for different ones of the conduits 42 to provide an even distribution of the regenerating fluid to the resin materials. Furthermore, a sleeve 49 composed of fine mesh screen surrounds each of the conduits 42. For a more detailed description of the conduits 42, reference may be had to the above-mentioned application, Ser. No. 396,840 which has now matured into U.S. Pat. No. 3,391,707.

In order to secure the upper ends of the conduits 42 to the bottom wall 16 in an evenly spaced-apart relationship, a plurality of resilient connectors 51 are secured in equally spaced relationship to the bottom wall 16 for mounting the conduits 42 within relatively close proximity to and spaced from the bottom wall 16. The resilient connectors may be composed of a resilient material, such, for example, as soft rubber. As shown in FIG. 4, each connector 51 includes an upstanding portion 55 having a circular opening 57 therein for loosely receiving the associated feed conduit, and a tab like foot 59 is fixedly secured to the rubber lining 13 of the bottom wall 16 by any suitable technique, such as cementing.

For the purpose of connecting the lower ends of the conduits 42 to the vertically-extending pipes 33, the upper ends of the pipes 33 extend through openings in the bottom wall 16 of the vessel 12. The pipes 33 are bent at right angles for connecting with the lower end of the conduits 42 by means of a coupling device 62. As shown in FIGS. 5 and 6, in order to secure the conduit 42 in sealable engagement with the pipe 33, the coupling device 62 for each conduit 42 includes a plate 64 which is cantilevered from the end of the pipe 33 and fixedly mounted thereon by any convenient means, such as by a weld 66. The plate 64 includes a pair of spaced-apart holes for slidably receiving a U-shaped locking pin 68 having its fingers inserted into the holes in the plate 64 and pushed downwardly along opposite sides of the conduit 42 within a peripheral groove 70 therein. The pin 64 is held by the force of gravity within the groove 70 to prevent the conduit 42 from spuriously pulling out of engagement with the pipe 33. The conduit 42 is sealed to the pipe 33 by an O-ring type resilient washer 72 mounted within a peripheral groove 74 in the end of the conduit 42.

OPERATION

Referring now to FIGS. 1—6, after the granulated resin to be regenerated has been pumped into the vessel 10, a suitable reactivating agent in the form of an ionized fluid or liquid is supplied under pressure to the apparatus 36 via the pipe 40 so that the fluid may be supplied to the annular manifold 31 via the pipe 37. Each of the control valves 35 for the pipes 33 is opened to permit fluid flow therethrough. A sufficient pressure is applied to the liquid to force the liquid through the pipes 33 so that the fluid enters the feed conduits 42, whereby the fluid is evenly distributed from the apertures 46 into the mass of resin material to cause an ion exchange. Depending upon the particular degree of ionization to be attained in reactivating the resin material, different temperatures and times may be involved.

Referring now to FIGS. 7—11, there is shown a system 10', which is a form of the above-described system 10 in accordance with the present invention. In the following description of the system 10', component parts of the system 10' that are similar to or the same as the corresponding component parts of the system 10, are designated by the same reference characters used to designate the corresponding parts of the system 10 with the addition of a prime. In the system 10', a hublike or generally cylindrical manifold 31' fits within an opening in the bottom wall 16' at the lowermost area thereof and is fixedly connected and sealed to the bottom wall 16' by any convenient means such as by annular welds 76 on the inside and outside of the vessel 12'. The manifold 31' includes a cylindrically shaped outer wall 78 and a cylindrically shaped inner wall 79 which is concentric with and spaced from the outer wall 78. An annularly-shaped top wall 81 is connected to the outer wall 78 at the underside of the periphery of the wall 81 by any suitable technique, such as welding and then grinding the welds to provide a smooth surface. The inside diameter of the inner wall 79 is the same as the diameter of the central opening in the top wall 81, and the inner wall 79 is connected to the underside of the top wall 81 in alignment with the central opening therein by any suitable technique, such as welding and then grinding the welds to provide a smooth surface. A bottom annularly-shaped wall 83 is connected to the outer wall 78 by a weld 85 and is connected to the inner wall 79 by any convenient technique such as welding and then grinding the welds.

The space between the outer wall 78 and the inner wall 79 forms an annular chamber 86 which is connected in fluid communication to a fluid transfer apparatus, such as the apparatus 36 (FIG. 1), by means of a pipe 37'. The pipe 37' is connected and sealed at 39' to a pipe 87 which extends through an opening in the outer wall 78 at the outside of the vessel 12' in sealable engagement therewith. The central space of the inner wall 79 forms a passageway 88 which serves the same purpose as the material feed pipe 15 of the system 10. The passageway 88 is connected in fluid communication with a material transfer apparatus, such as the apparatus 20 of the system 10, by means of a pipe 15'. The pipe 15' has an inside diameter which is the same as the inside diameter of the inner wall 79 and which is aligned therewith, and it has a flange 90 which is connected to the bottom wall 83 of the manifold 31' in sealable engagement therewith by means of a set of mounting bolts 92.

For the purpose of supplying regenerating fluid from the annular chamber 86 to the resin materials within the vessel 12', a plurality of conduits 42' are connected to the manifold 31' in a spacedeapart relationship about the outer wall 78 that extends within the vessel 12' and extends from the outer wall 78 in a radial direction with respect to the central axis of the vessel 12'. The conduits 42' extend through openings in the outer wall 78 and are connected in sealable engagement therewith, in the same manner as described in connection with the feed conduits 42 for the system 10. In order to connect the conduits 42' to the manifold 31', there is provided a series of coupling devices 62' which are similar to the coupling devices 62 of the system 10, except that, as shown in FIGS. 9 and 10, the plates 64' form a part of the top wall 81 of the manifold 31' and extend outwardly in a radial direction above each of the conduits 42'.

Referring now to FIGS. 12—14, there is shown a system '', which is another form of the above-described system 10 in accordance with the present invention. In the following description of the system 10'', component parts of the system 10'' that are similar to or the same as the corresponding component parts of the system 10, are designated by the same reference characters used to designate the corresponding parts of the system 10 with the addition of a double-prime notation. In the system 10'', a second set of perforated feed conduits 94 extends radially along the bottom wall 16'' of the vessel 12'' in the same manner as the perforated conduits 42 described in connection with the system 10. The feed conduits 94 are relatively shorter in length than the conduits 42'', and the shorter conduits 94 alternate with the longer feed conduits 42'' in an equally-spaced manner. The conduits 94 extend from a point displaced a relatively greater radial distance away from the axis of the vessel 12'' than the corresponding lower ends of the longer feed conduits 42'', but the conduits 94 extend radially along the bottom wall 16'' toward the sidewalls of the vessel 12'' to substantially the same elevation as the upper ends of the longer conduits 42''.

Each of the feed conduits 94 are connected in fluid communication to an annular manifold or header 96 by means of a set of connector pipes 98, which are similar to the connector pipes 33'' that connect the feed conduits 42'' to the manifold 31''. The annular manifold 96 is located beneath the exterior of the central portion of the bottom wall 16'' of the vessel 12'' and has a relatively larger diameter than the diameter of the manifold 31'' so that the annular manifold 96 concentrically surrounds the inner manifold 31'' and, as shown in FIG. 14, the annular manifold 96 is aligned with the inner manifold 31''. The connector pipes 98 extend through openings in the bottom wall 16'' and are welded in sealable engagement to the bottom wall 16'' at 34'' (FIG. 14). The connector pipes 98 are connected to control valves 101 for individually controlling the flow of fluid through each connector pipe 98. Therefore, a greater degree of flexibility and control of the fluid to and from the vessel 12'' is provided so that a controlled amount of fluid may flow depending upon which ones of the control valves 35'' and 101 are open. Also, the system 12'' provides a still greater amount of even distribution of fluid to the vessel 12'' due to the spacing and location of the feed conduits and also due to the increased number of feed conduits.

Referring now to FIG. 15, there is shown a system 10a, which is a further form of the above-described system 10 in accordance with the present invention. In the following description of the system 10a, component parts of the system 10a that are similar to or the same as the corresponding component parts of the system 10, are designated by the same reference characters used to designate the corresponding parts of the system 10 with the addition of the letter "a", for example, "the system 10a. " In the system 10a, a set of perforated feed conduits 42a and a second set of perforated feed conduits 94a are provided which generally conform to the adjacent portion of the conically-shaped bottom wall 16a. For sake of clarity, only one of the conduits 42a and only one of the conduits 94a are shown in FIG. 15. The feed conduits 94a are relatively shorter in length than the feed conduits 42a, and both sets of conduits are constructed similarly to the feed conduits 42 of the system 10. Both the conduits 94a and the conduits 42a are connected in fluid communication to the annular manifold 31a located at the bottom wall 16a of the vessel 12a by means of connector pipes 101 and 103, respectively. The pipes 101 and 103 may be composed of a flexible material, such, for example, as rubber tubing. The connector pipe 101 is connected to the feed conduit 94a by a control valve 105, a sight glass 107, and a connector pipe 108 so that the fluid flowing to or from the conduit 94a may be controlled by the control valve 105. The fluids may be observed by means of the sight glass 107 to ascertain the color or other condition of the fluid passing therethrough. The feed conduits 42a are connected to the connector pipes 103 by means of a control valve 35a, a sight glass 109, and a connector pipe 33a. The feed pipe 15a of the vessel 12a is connected to the pipe 22a by means of a shutoff valve 111. The manifold 31a is supported by means of a support bracket 113 which is secured to the bottom wall 16a of the vessel 12a at 115.

It is apparent from the foregoing description that there is provided in accordance with principles of the present invention a new and improved material processing apparatus which includes a generally arcuate manifold mounted at the central portion of the bottom wall of the processing vessel and connected in fluid communication with a series of radially-extending feed conduits. Consequently, in accordance with the present invention a relatively smaller size manifold may be employed.

While there have been shown and described and pointed out the fundamental novel features of the invention, it will be understood that various omissions and substitutions and changes in the form and details of the system illustrated and in its operation may be made by those skilled in the art, without departing from the spirit of the invention. It is the intention, therefore, to be limited only as indicated by the scope of the following claims.

We claim:

1. A material processing vessel or the like having a bottom wall portion with an opening therein for fluid flow there through, and having fluid feed means for supplying fluid to said vessel to process said material contained therein, said feed means including a manifold and a plurality of perforated feed conduits connected to said manifold in fluid communication therewith, wherein the improvement resides in said manifold, said manifold comprising:

means defining a chamber for communicating with said plurality of feed conduits;

said bottom wall of said vessel including a plurality of openings therein;

manifold mounting means for mounting said means defining a chamber on said bottom wall at the central portion thereof aligned with the central axis of the vessel, said manifold mounting means comprising a plurality of connector conduits connected to said means defining a chamber in fluid communication therewith and extending through said openings in said bottom wall for connecting to said plurality of feed conduits in fluid communication therewith;

connecting means for connecting said feed conduits to said means defining said chamber so that said feed conduits extend in a radial direction away from said central axis toward the side walls of said vessel;

each of said feed conduits including a peripheral groove near the end thereof; and said connecting means including a plurality of U-shaped locking pins and a plurality of plates each secured to the end of one of said connector conduits and extending therefrom, each of said plates having a pair of spaced-apart holes for receiving one of said locking pins to extend along opposite sides of a corresponding one of said feed conduits within said peripheral groove.

2. A material processing vessel comprising: in a tank having sidewalls and a sloping bottom wall terminating in: a lowermost material feed opening;

fluid feed means including means defining a chamber disposed near said material feed opening and a plurality of perforated feed conduits communicating with said chamber and extending radially from said means defining a chamber along said bottom wall toward said sidewalls;

a plurality of resilient orienting devices each secured to the end of each of said feed conduits nearest the sidewalls of said vessel for maintaining said feed conduits in a given spaced-apart relationship; and said devices each comprising a spacer plate having an opening therein for snugly receiving one of said feed conduits to mount it in relatively close proximity to and spaced from said bottom wall of said vessel, and a tab connected to said plate for fixedly attaching said plate to said bottom wall of said vessel.

3. A material processing vessel comprising:

a tank having sidewalls and a sloping bottom wall terminating in a lowermost material feed opening, said bottom wall of said vessel including a plurality of openings therein;

fluid feed means including means defining a chamber disposed near said material feed opening and a plurality of perforated feed conduits communicating with said chamber and extending radially from said means defining a chamber along said bottom wall toward said sidewalls;

a plurality of short feed conduits, said short feed conduits being relatively shorter in length than the first-mentioned feed conduits;

means defining a second chamber for communicating with said plurality of short conduits;

a first plurality of connector conduits connected to the first-mentioned means defining a chamber in fluid communication therewith and extending through corresponding ones of said openings in said bottom wall for connecting to said first-mentioned feed conduits in fluid communication therewith; and a second plurality of connector conduits connected to said means defining a second chamber in fluid communication therewith and extending through corresponding ones of said openings in said bottom wall for connecting to said short feed conduits in fluid communication therewith.

4. The combination according to claim 3:

wherein said first-mentioned means defining a chamber comprises a first annular pipe connected to said first plurality of connector conduits; and said means defining a second chamber comprises a second annular pipe connected to said second plurality of connector conduits and concentrically disposed with respect to said first annular pipe.

5. The combination according to claim 4, wherein said first-mentioned feed conduits alternate with said short feed conduits.

6. A material processing vessel comprising:

a tank having sidewalls and a sloping bottom wall terminating in a lowermost material feed opening, said feed means being adapted to feed processing materials into and out of said tank;

fluid feed means including means defining a chamber disposed near said material feed opening, a plurality of perforated feed conduits extending radially within said tank upwardly along said bottom wall toward said sidewalls, and means for connecting said conduits in fluid communication with said chamber, said conduits being adapted to feed fluids into and out of said tank, said means defining a chamber comprising a generally cylindrical hub extending through said opening in said bottom wall of said vessel; and said chamber having an annular shape in said hub and said feed conduits being connected to said hub in fluid communication with said annular chamber in a spaced-apart relationship about the periphery of said hub located within said vessel.

7. A material processing vessel comprising:

a tank having sidewalls and a sloping bottom wall terminating in a lowermost material feed opening, said feed means being adapted to feed processing materials into and out of said tank;

fluid feed means including means defining a chamber disposed near said material feed opening, a plurality of perforated feed conduits extending radially within said tank upwardly along said bottom wall toward said sidewalls, and means for connecting said conduits in fluid communication with said chamber, said conduits being adapted to feed fluids into and out of said tank;

said bottom wall of said vessel being conically shaped and including a plurality of openings therein;

said plurality of feed conduits including short feed conduits and long feed conduits, said long feed conduits being relatively longer in length than said short feed conduits;

a first plurality of connector conduits connected to said means defining a chamber in fluid communication therewith and extending through corresponding ones of said openings in said bottom wall for connecting to said short feed conduits in fluid communication therewith, and a second plurality of connector conduits connected to said means defining a chamber in fluid communication therewith and extending through corresponding ones of said openings in said bottom wall for connecting to said long feed conduits in fluid communication therewith; and valve means for selectively connecting and disconnecting said conduits with said chamber whereby the number of conduits used in the operating cycle may differ from the number used in the backwash or cleaning cycle.

8. A material processing vessel having a:

sloping bottom wall portion terminating in a lowermost material feed opening through which resins or other granulated materials may be supplied to or removed from the vessel, and fluid distributing and collecting means for collecting fluid passed through said vessel during an operating cycle and for distributing fluid to said vessel during a backwash or cleaning cycle, the improvement being in said fluid distributing and collecting means and comprising;

a manifold mounted at the bottom of said vessel and surrounding said feed opening;

a plurality of perforated feed conduits connected to said manifold and extending radially outwardly and upwardly along said sloping bottom wall within said vessel thereby to drain under the force of gravity into said manifold;

said manifold including a plurality of annular chambers, a first group of said conduits being connected to one of said chambers, a second group of said conduits being connected to a different one of said chambers.

9. A material processing vessel according to claim 8 wherein, the conduits of said first group of conduits are interspersed with the conduits of said second group.

10. A material processing vessel according to claim 9 wherein, the conduits of said first group are longer than the conduits of said second group.